June 1, 1937.  W. A. DOREY ET AL  2,082,100
LIGHT SPREADING LENS
Filed Sept. 7, 1933   2 Sheets-Sheet 1

INVENTORS.
WILLIAM A. DOREY
THOMAS W. ROLPH
BY
ATTORNEY.

June 1, 1937.  W. A. DOREY ET AL  2,082,100
LIGHT SPREADING LENS
Filed Sept. 7, 1933   2 Sheets-Sheet 2

INVENTORS.
WILLIAM A. DOREY
THOMAS W. ROLPH
BY
ATTORNEY.

Patented June 1, 1937

2,082,100

UNITED STATES PATENT OFFICE 2,082,100

LIGHT SPREADING LENS

William A. Dorey and Thomas W. Rolph, Newark, Ohio, assignors to Holophane Company, Inc., New York, N. Y., a corporation of Delaware Application September 7, 1933, Serial No. 688,450

11 Claims. (Cl. 240—106.1)

The present invention relates to light spreading lenses, and luminairs employing such lenses. It is more particularly directed toward light control wherein flat (or substantially flat) prismatic lenses or plates are employed.

Light controlling plates have previously been provided with annular or concentric prisms of the concentrating type designed to emit rays (originating at the focus) parallel with the lens axis, or concentrated into a round beam of substantially parallel rays so that an intense beam of light is produced, characterized by a lack of divergence or spread of the beam sufficient for general illumination. This beam, by itself, may produce a bright spot. With a lens system on one side of the plate only, it is not feasible to obtain a highly illuminated spot and wide divergence for general illumination with smooth gradation of light throughout the area. If some of the prisms are employed to diverge the light, an annular ring of more intense light is formed, with a comparatively dark ring between it and the intense spot. The appearance of the lens is also impaired.

Where the concentrating prisms are parallel to one another, two series of parallel prisms are employed on opposite sides of a median line and of increasing angle so that the light is concentrated in a plane at right angles to the prism system and is allowed to spread in planes parallel with the prisms.

In order to increase the spreading of the rays emitted by these plates or lenses, it has been customary to shift the light source from the focus to a point closer to the plate. The range of spreading by this means is comparatively limited. Wide divergence of light is not possible, and the attractiveness of the lighted lens is likely to be lessened.

The present invention contemplates controlled and predetermined spreading of light by prismatic action. Accordingly, the light spreading is accomplished by a lens having on the outer surface a lens formation of the concentrating type tending to build up the illumination into an intense beam (either round or flat), and having on the opposite (inner) surface prisms covering all, or only a portion of the surface, which inner prisms differ in direction from the outer prisms and receive the light at angles of incidence less than would be the case were there no such prisms, whereby the light in the glass (or other refracting medium) diverges at a greater angle than it would in the absence of such prisms. Where this divergent light (in the glass) falls on the active surfaces of the concentrating prisms, it is deviated to some extent, but not into rays parallel with the lens axis. If the rays in the glass do not fall on the active surface of a concentrating prism, the light is diverged further as it passes through the surface of the glass into air. Where the light spreading is accomplished as contemplated by the present invention, one obtains divergent light and at the same time retains the essentially concentrated character of the illumination for intense lighting.

The accompanying drawings show, for purposes of illustrating the present invention, several embodiments in which the invention may take form, it being understood that the drawings are illustrative of the invention rather than limiting the same. In these drawings.

Figure 6:
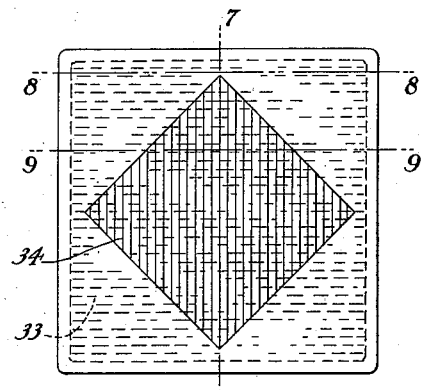
Figure 7:
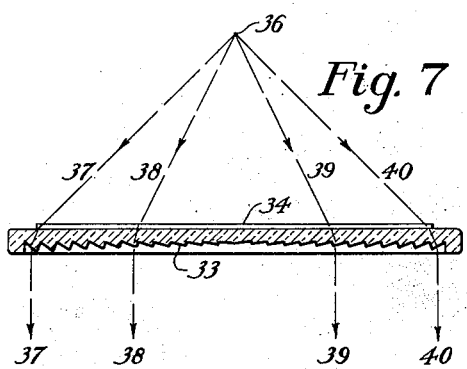
Figure 8:
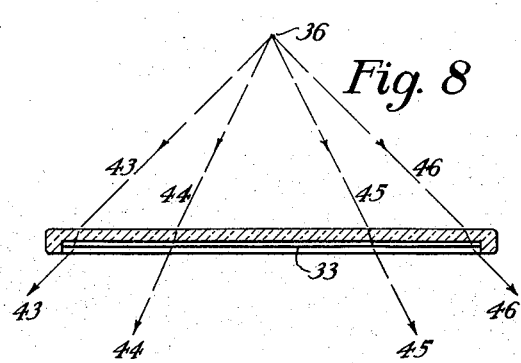
Figure 9:
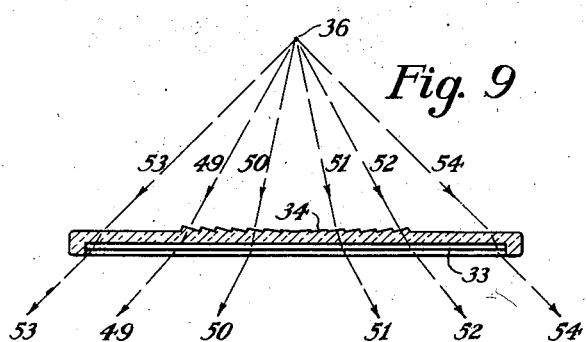

Fig. 6 shows a lens in which the concentrating prisms run in parallel straight lines and the supplementary spreading prisms are in parallel straight lines perpendicular to the first prisms and form a square or diamond shaped design; and Figs. 7, 8 and 9 are cross sections taken on the lines 7—7, 8—8 and 9—9 respectively of Fig. 6.

For convenience in illustration, the drawings show flat lenses, but it is to be understood that the present invention is applicable to curved or dished lenses as well as to flat ones.

Figure 1:
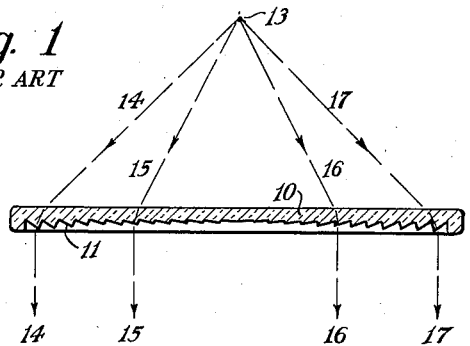
Fig. 1 is a cross section through a lens of the type heretofore in use.

Fig. 1 shows at 10 an ordinary flat lens with concentrating prisms 11 on the outer surface. These prisms may be annular or parallel. Light from the light source 13 strikes the flat inner surface of the lens, is deviated to some degree by this inner surface and is further deviated by the prisms on the outer surface so that the emerging beam is a beam of parallel light. These refractions take place in the same plane. Typical light-rays are indicated at 14, 15, 16 and 17.

Figure 2:
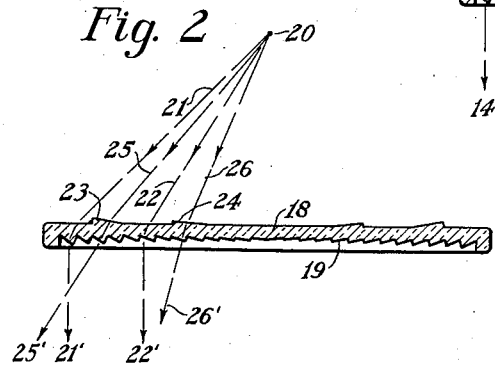
Fig. 2 is a cross section illustrating the application of supplementary prisms to such a lens, whereby a wider distribution of light may be produced.

Fig. 2 shows a cross section of a lens 18 with prisms 19 on the outer surface similar to the prisms 11, and a light source 20. Light rays such as 21 and 22 striking the smooth surface on the inner side of the lens are refracted by this surface and by the outer prisms to emerge as parallel light in a beam without shifting them out of the plane of the original rays, as indicated at 21' and 22'. The upper surface of the lens is also provided with prismatic formations 23 and 24. These are tipped toward the light source and hence the angle of incidence on the inner surface for light from the light source is decreased. Light rays 25 and 26 strike the inner surface of the lens at lower angles of incidence than light rays 21 and 22. The deviation obtained is, therefore, less and although some further deviation is obtained by the prismatic structure on the outer surface, the net result is that light rays 25' and 26' (in the same planes as the corresponding incident rays) emerge from the lens in the form of a spreading beam of light instead of a concentrated beam represented by light rays 21' and 22'.

In using lenses for general lighting purposes, it is frequently desirable to have both concentrated light and spreading light from the same lens. This produces a mixed beam of light which is in effect still a beam, but spread to some degree as compared with the extreme concentration frequently obtained. In such cases the inner prisms on the lens, which reduce the angle of incidence at the inner surface, preferably occupy only a portion of the lens area. This contributes to the appearance of the lens, especially when lighted. Where less concentration and more spreading is desired, the inner prisms occupy more of the surface. They may in some cases cover the entire surface.

Figure 3:
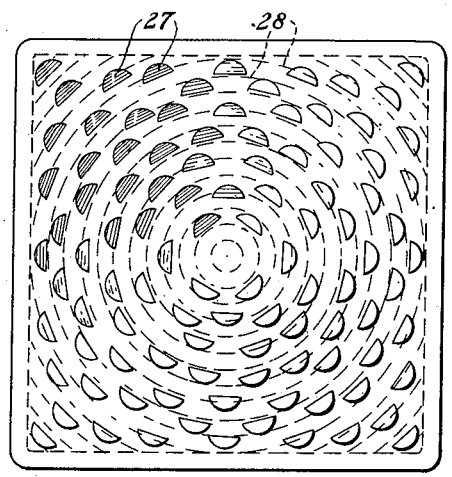
Fig. 3 is a plan view illustrating these supplementary prisms in the form of ungulas or crescents.

Fig. 3 shows in plan a lens design in which these inner prisms are made in the form of ungulas or crescents 27. These are scattered over the lens in an irregular pattern with plain spaces between. The concentrating prisms 28 are concentric. They are shown dotted as they are on the opposite side of the lens in this illustration. The ungulas or crescents are not parallel with the outer concentric prisms. They operate as shown at 23 and 24 in Fig. 2 but deviate the light slightly out of the plane of the incident ray. This results in a certain spreading of the light beam, which is desirable from the illuminating standpoint, and also produces a pleasing texture to the lens itself. This greatly enhances the appearance of the lens when cold and when lighted.

Figure 4:
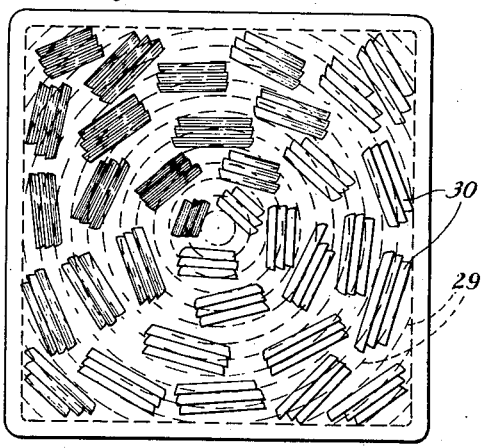
Fig. 4 is a plan view illustrating the supplementary prisms arranged in small groups of parallel prisms, the prisms in each group running at different angles from those in the other groups.

In Fig. 4 the inner prismatic formation reducing the angle of incidence and thereby giving spread to the light is in the form of small groups of parallel prisms. Concentric concentrating prisms are shown by dotted lines 29 and the groups of parallel prisms are indicated at 30. These prisms preferably approximate a concentric design. Therefore, the use of straight lines in the general direction of circular arcs produces a satisfactory effect. By arranging these prisms in small groups of parallel lines and distributing the groups over the surface of the lens, the desired optical effect is obtained and a pleasing appearance is also obtained.

Figure 5:
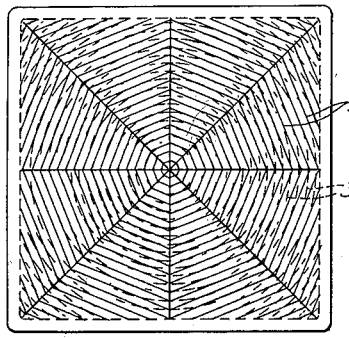
Fig. 5 is a plan view illustrating the supplementary prisms in the form of chords of circles, producing a spider-web design.

Fig. 5 shows a lens carrying out the same general principles, in which another pattern is used. In this case each group of straight parallel prisms 31 occupies a sector of the lens. The resulting effect is that of a spider-web design superimposed upon the concentric prisms 32 on the opposite side of the lens.

In the lens shown in Figs. 6–9, inclusive, concentration is obtained in one plane only; the concentrating prisms 33 on the outside of the lens are straight parallel prisms of the same character as shown in Fig. 1. These produce a beam concentrated in directions perpendicular to the prisms, but the same degree of spread is obtained as given by the light source in directions parallel with the prisms.

As shown in Figs. 6–9, the prismatic pattern on the inner surface is made up of parallel prisms 34 reducing the angle of incidence on this surface. It is in the form of a square design set into the lens diagonally. The prisms 34 themselves, however, are perpendicular to the prisms 33 on the outer surface.

As the section of Fig. 7 is parallel to the prisms 34 on the inner surface, no effect is obtained from these prisms. Light from the light source 36 passes through the main concentrating prisms 33 on the outer surface, as indicated by typical light rays 37, 38, 39, and 40. These rays are concentrated into a beam by the same action as illustrated in Fig. 1.

Fig. 8 is a cross section of the lens in a plane perpendicular to that shown in Fig. 7 and along the line 8—8 of Fig. 6. The light source is shown at 36. This section is outside of the area covered by the supplementary inner prisms 34 and is parallel to the direction of the concentrating outer prisms 33. Therefore no prismatic effect is obtained in the plane shown in Fig. 8. Light rays 43, 44, 45, and 46 are illustrated passing through the lens without any net change in direction. There is a deviation at the inner surface which is compensated for by a corresponding return deviation at the outer surface so that no change in direction is obtained.

Fig. 9, taken on the line 9—9 of Fig. 6, illustrates the action of the light spreading prisms. The light source is shown at 36. This section is parallel to the cross-section shown in Fig. 8. However, it includes some of the prisms 34 on the inside surface. These act to reduce the angle of incidence at the inner surface and thereby to decrease the deviation obtained at the inner surface and to increase the deviation obtained at the outer surface, so that the net result is a spreading of the light rays which come through this portion of the lens in the plane shown in Fig. 9. Typical light rays 49, 50, 51 and 52 indicate this spreading effect. Light rays 53 and 54 outside of the area covered by the interior prisms are not changed in direction and such light has only the normal spread of the light from the light source itself. Thus the use of the inside prisms 34 produces a greater spread of light in directions parallel to the prisms on the outer surface than would otherwise be obtained. The resulting light distribution is concentrated completely in one set of parallel planes represented by 7—7 of Fig. 6 and is spread to a wide degree in the parallel planes at right angles represented by 9—9 of Fig. 6.

It will be obvious that the interior prisms reducing the deviation at the interior surface may be applied in many different patterns and over any desired area of the lens and with any desired degree of light deviating effect. It will also be obvious that such prisms may be applied to lenses of various designs. The lens prisms proper may be concentric as in Figs. 1 to 5, inclusive. They may be parallel as in Figs. 6–9, inclusive, or they may run in other directions, provided they give a concentrating or partially concentrating effect.

It is obvious that the invention may be embodied in many forms and constructions within the scope of the claims, and we wish it to be understood that the particular forms shown are but a few of the many forms. Various modifications and changes being possible, we do not otherwise limit ourselves in any way with respect thereto.

What is claimed is:

1. A luminair comprising a light source, a lens having on its outer surface an unmodified system of prisms to reduce the divergence of the light, and opposed light transmitting and refracting prisms on its inner surface which deviate slightly from the direction of the outer prisms and reduce the average angle of incidence at that surface, whereby the deviation of the light on entering the lens and on leaving the lens is lessened so that the emergent light is spread.

2. A luminair as claimed in claim 1, wherein the inner prisms occupy only a portion of the inner surface so that the portion of the light falling outside said prisms is transmitted at angles solely under the control of the outer prisms.

3. A luminair as claimed in claim 1, wherein the outer prisms are concentric and the inner prisms are shifted slightly out of concentric formation.

4. A luminair as claimed in claim 1, wherein the outer prisms are concentric and the inner prisms are in the form of ungulas or crescents.

5. A luminair comprising a light source, a lens having on its entire outer surface a light condensing prismatic configuration adapted in conjunction with a non-prismatic inner surface to produce a predetermined light pattern, the lens having on a portion only of its inner surface prismatic light transmitting and refracting elements, having incident surfaces at less angle of incidence than the adjacent non-prismatic areas whereby the average angle of incidence on said prismatic areas is reduced and the paths of the refracted light in the glass are less deviated, and whereby the light emitted from the opposite outer prisms is more divergent.

6. A luminair comprising a light source, a condensing lens having prisms on its outer surface for concentrating the rays from the light source into an intense beam of predetermined spread, and on the inner surface and opposite the outer prisms a prismatic light transmitting and refracting formation which occupies only a portion of said surface so as to contribute to the appearance of the lens and adapted to reduce the average angle of incidence of light rays from said source so that the portions of the light rays passing therethrough with reduced deviation are spread more widely in their passage through the lens, are less concentrated by the outer prisms and are emitted at increased spread, while the remaining rays are emitted at angles of less spread determined by the outer prisms only.

7. A luminair as claimed in claim 6, wherein the outer prisms are parallel to one another and the inner prisms are parallel to one another and at right angles to the outer prisms so as to effect an increased spreading of light on planes parallel with the outer prisms.

8. A luminair as claimed in claim 6, wherein the outer prisms are parallel to one another and the inner prisms are parallel to one another and at right angles to the outer prisms, and wherein the inner prisms occupy the entire area of the central portion of the lens.

9. A luminair as claimed in claim 6, wherein the outer prisms are parallel to one another and the inner prisms are parallel to one another and at right angles to the outer prisms, and wherein the inner prisms are disposed in a square area with the longest prism a diagonal of the square.

10. A luminair as claimed in claim 6, wherein the outer prisms are concentric, and the inner prisms are shifted slightly out of concentric formation.

11. A luminair as claimed in claim 6, wherein the outer prisms are concentric and the inner prisms are in the form of ungulas or crescents.

WILLIAM A. DOREY.
THOMAS W. ROLPH.